(12) United States Patent
Miller et al.

(10) Patent No.: US 9,789,765 B2
(45) Date of Patent: Oct. 17, 2017

(54) HYBRID VEHICLE AND METHOD OF HEATING ENGINE COOLANT

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 14/713,586

(22) Filed: May 15, 2015

(65) Prior Publication Data

US 2016/0332520 A1 Nov. 17, 2016

(51) Int. Cl.
| | |
|---|---|
| *B60L 1/02* | (2006.01) |
| *B60L 7/10* | (2006.01) |
| *B60W 10/30* | (2006.01) |
| *B60W 20/00* | (2016.01) |
| *B60K 6/22* | (2007.10) |
| *B60K 11/02* | (2006.01) |
| *B60L 7/18* | (2006.01) |
| *B60L 11/14* | (2006.01) |
| *B60L 15/20* | (2006.01) |
| *B60H 1/00* | (2006.01) |

(52) U.S. Cl.
CPC ............... *B60L 1/02* (2013.01); *B60K 6/22* (2013.01); *B60K 11/02* (2013.01); *B60L 7/10* (2013.01); *B60W 10/30* (2013.01); *B60W 20/00* (2013.01); *B60H 1/004* (2013.01); *B60L 7/18* (2013.01); *B60L 11/14* (2013.01); *B60L 15/2045* (2013.01); *B60L 2240/36* (2013.01); *B60L 2240/445* (2013.01); *B60W 2510/244* (2013.01); *B60W 2560/00* (2013.01); *B60W 2710/086* (2013.01); *B60W 2710/305* (2013.01); *Y02T 10/645* (2013.01); *Y02T 10/70* (2013.01); *Y02T 10/7077* (2013.01); *Y02T 10/72* (2013.01); *Y02T 10/7283* (2013.01); *Y10S 903/904* (2013.01)

(58) Field of Classification Search
CPC .. B60K 6/22; B60K 11/02; B60L 1/02; B60L 7/10; B60W 10/30; B60W 20/00
See application file for complete search history.

(56) References Cited

U.S. PATENT DOCUMENTS

| | | | | |
|---|---|---|---|---|
| 5,291,960 | A * | 3/1994 | Brandenburg | ............ B60L 7/22 180/65.27 |
| 5,345,761 | A * | 9/1994 | King | ......................... B60L 1/12 180/65.245 |
| 6,040,561 | A | 3/2000 | Murty | |
| 6,687,603 | B2 * | 2/2004 | Wakashiro | ............... B60L 11/14 180/65.27 |
| 2002/0043410 | A1 * | 4/2002 | Suzuki | ................... B60W 10/06 180/65.25 |

(Continued)

*Primary Examiner* — Dale W Hilgendorf
(74) *Attorney, Agent, or Firm* — David Kelly; Brooks Kushman P.C.

(57) ABSTRACT

A vehicle is provided. The vehicle includes an engine, an electric machine, an electric heater, and a controller. The electric machine is configured to recharge a battery through regenerative braking. The electric heater is configured to heat an engine coolant. The controller is programmed to redirect regenerative braking power to the electric heater in response to the engine coolant temperature being below a threshold.

9 Claims, 3 Drawing Sheets

(56) References Cited

U.S. PATENT DOCUMENTS

| | | | |
|---|---|---|---|
| 2008/0305922 A1* | 12/2008 | Hoffmann | B60W 10/30 701/22 |
| 2011/0125351 A1 | 5/2011 | Bauerle | |
| 2011/0178665 A1* | 7/2011 | Yoshioka | B60W 10/06 180/65.27 |
| 2012/0173060 A1 | 7/2012 | Sujan et al. | |
| 2013/0297138 A1* | 11/2013 | Fushiki | B60W 10/06 180/65.265 |
| 2016/0090096 A1* | 3/2016 | Cauthen | B60W 10/30 180/65.27 |

* cited by examiner

HYBRID VEHICLE AND METHOD OF HEATING ENGINE COOLANT

TECHNICAL FIELD

The present disclosure relates to hybrid vehicles and methods of redirecting regenerative breaking power in order to heat engine coolant.

BACKGROUND

Internal combustion engines operate more efficiently once the engine coolant and the engine oil have each reached optimal operating temperatures.

SUMMARY

A vehicle is provided. The vehicle includes an engine, an electric machine, an electric heater, and a controller. The electric machine is configured to recharge a battery through regenerative braking. The electric heater is configured to heat an engine coolant. The controller is programmed to direct regenerative braking power to the electric heater in response to a temperature of the engine coolant being less than a threshold.

A method of heating engine coolant in a hybrid vehicle is provided. The method includes generating power with an electric machine via regenerative braking and directing the power from the electric machine to an electric heater in order to heat the engine coolant based upon a temperature of the engine coolant being less than a threshold.

A vehicle is provided. The vehicle includes an engine, an electric machine, an electric heater, and a controller. The electric machine is configured to recharge a battery through regenerative braking. The electric heater is configured to heat an engine coolant. The controller is programmed to direct regenerative braking power to the electric heater in response to an oil temperature of the engine being less than a threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
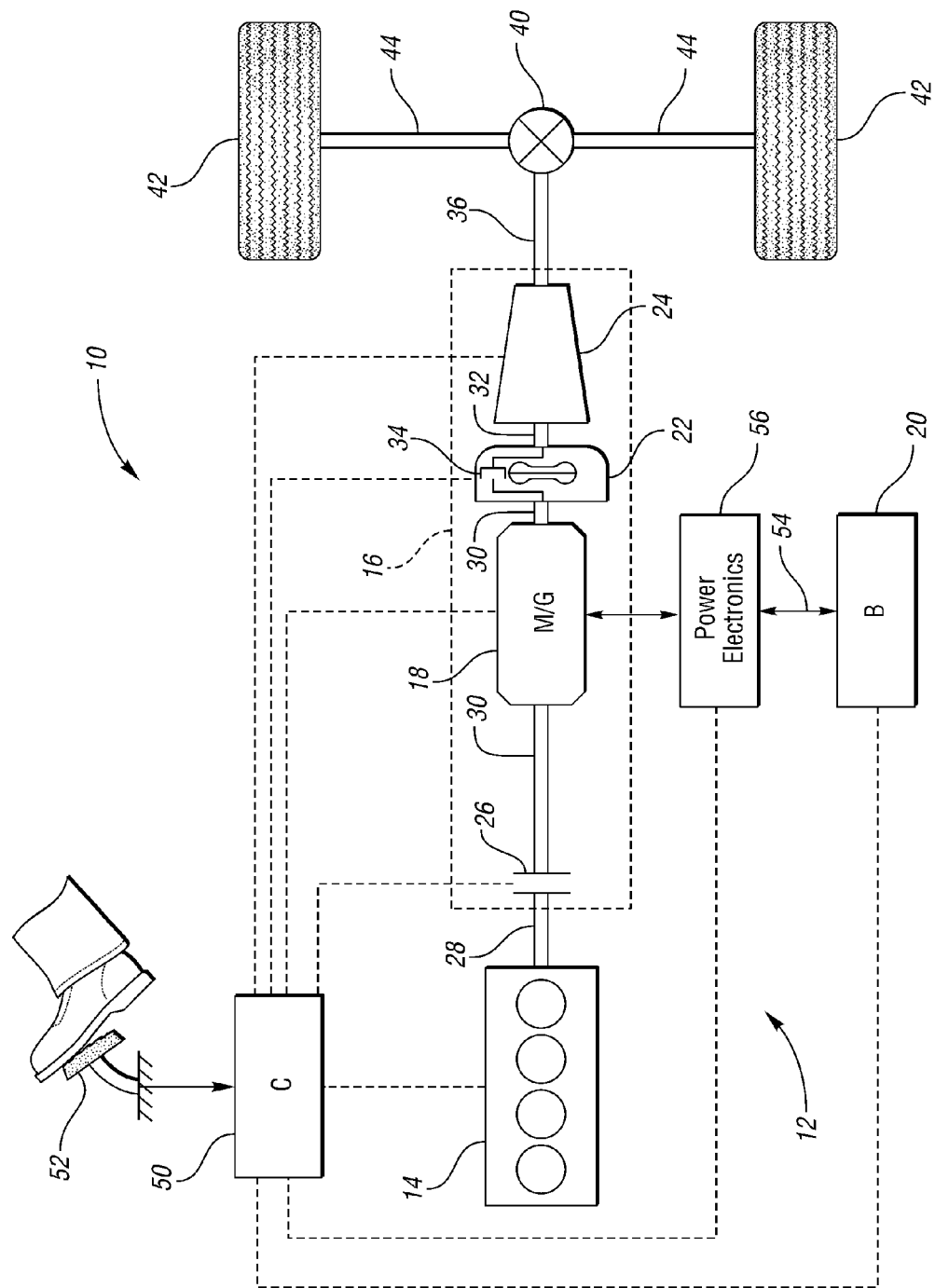
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited.

Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
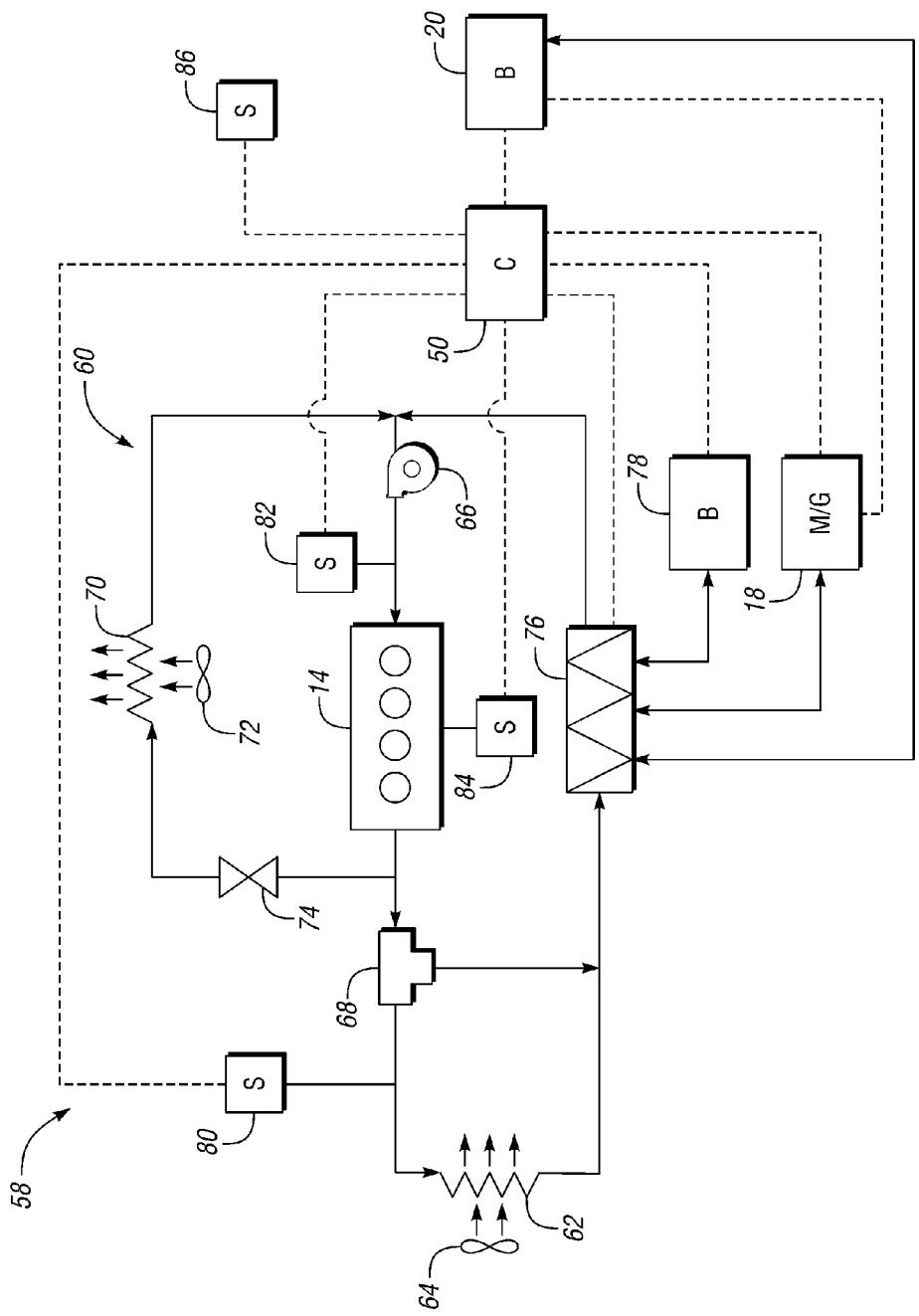
FIG. 2 is a schematic illustration of an exemplary cooling system of an engine in a hybrid electric vehicle.

Referring to FIG. 2, a schematic diagram of a cooling system 58 of the engine 14 is illustrated according to an embodiment of the present disclosure. The cooling system 58 includes a series of cooling loops 60. A coolant is cycled through the cooling loops 60 in order to remove excess heat from the engine 14. The cooling loops 60 may include at least one heat exchanger that is configured to remove the excess heat from the coolant. For example, excess heat may be transferred from the coolant to the external surroundings of the HEV 10 when the coolant flows from the engine 14 and through a first heat exchanger 62 (i.e., radiator). A fan 64 may be included to direct air to flow across the first heat exchanger 62, such that heat is transferred from the coolant flowing through the first heat exchanger 62 to the air. A pump 66 is used to cycle the coolant through the cooling loops 60. A thermostat 68 may be included to cause the coolant to bypass the first heat exchanger 62 and continuously cycle the coolant through the engine 14 until an optimal operating temperature of the coolant is obtained. A second heat exchanger 70 (i.e., cabin heater or heater core) may be utilized to transfer excess heat from the coolant to air that is flowing into the cabin of the HEV 10. A blower fan 72 is included to direct the air flowing into the cabin to flow across the second heat exchanger 70, such that heat is transferred from the coolant flowing through the second heat exchanger 70 to the air. A control valve 74 may be used to throttle or shut-off the coolant flowing through the second heat exchanger 70. The control valve 74 may be connected to a climate control system of the cabin and may be configured to open and close based on the climate demands of an occupant of the cabin. The blower fan 72 may also be connected to the climate control system and configured to operate based on the climate demands of the occupant of the cabin.

The cooling system 58 may also include an electric heater 76 that may be utilized to transfer heat to the coolant that is flowing through the cooling loops 60. The electric heater 76 may be any type of electric heater that may be used to transfer heat to a fluid, including heaters having resistance heating elements, immersion heaters, and positive temperature coefficient (PTC) heaters. The electric heater 76 may be in communication with the controller 50. The controller 50 may be configured to activate the electric heater 76 under circumstances where it may be advantageous to transfer heat to the coolant flowing through the cooling loops 60.

The electric heater 76 may receive power via electrical wiring from the traction battery 20, an accessory battery 78 (such as a 12 V battery commonly found in automobiles), an alternator (not shown), the M/G 18, or any other power source that may be included in the HEV 10. The electric heater 76 may be configured to accept AC and/or DC electrical power. An AC to DC converter may be included if the electric heater 76 is configured to operate only on DC electrical power and the power source (e.g., alternator or M/G 18) is configured to generate AC electrical power. A DC to AC converter may be included if the electric heater 76 is configured to operate only on AC electrical power and the power source (e.g., battery) is configured to generate DC electrical power.

The controller 50 may also be in communication with the traction battery 20, accessory battery 78, M/G 18, alternator, or any other power source that may be utilized to power the electric heater 76. The controller 50 may coordinate which power source will be utilized to power the electric heater 76 when conditions exist where it would be advantageous to transfer heat to the coolant in the cooling loops 60. For example, the traction battery 20 may be used to power the electric heater 76 if the traction battery 20 is sufficiently charged, the accessory battery 78 may be used to power the electric heater 76 if the accessory battery 78 is sufficiently charged, the M/G 18 may be used to power the electric heater 76 if the M/G 18 is operating as a generator, or the alternator may be used to power the electric heater 76.

The controller 50 may also be in communication with a series of sensors that are configured to communicate to the controller 50 certain conditions of the HEV 10 or the surrounding environment. At least one coolant temperature sensor may be configured to communicate the temperature of the coolant in the cooling loops 60 to the controller 50. In the illustrated embodiment a first coolant temperature sensor 80 is shown on the outlet side of the engine 14 and a second coolant temperature sensor 82 is shown on the inlet side of the engine 14. The disclosure however should not be construed as limited to this configuration, but should be construed to include s cooling systems that have one or more coolant temperature sensors that may be disposed at any location within the cooling loops 60. At least one engine oil temperature sensor 84 may be configured to communicate the temperature of the engine oil to the controller 50. The engine oil temperature sensor 84 may be disposed at any appropriate location within the engine 14 that is capable of providing an accurate oil temperature reading. At least one ambient air temperature sensor 86 may be configured to communicate the temperature of the surrounding environment to the controller 50.

The cooling system 58 is meant for illustrative purposes only and should not be construed as limited to the particular structure and configuration shown in FIG. 2. For example, the order or position of the cooling loops 60 (or components located within the cooling loops) may be reorganized or rearranged; the cooling system 58 may include an overflow tank or degas bottle; the cooling system 58 may include additional cooling loops that are used to cool other components of the HEV 10, such as the transmission gearbox 24, torque converter 22, power electronics 56, or M/G 18, catalytic converter (not shown), turbocharger (if included), or any other vehicle component that may require cooling.

It may be advantageous to operate the electric heater 76 in order to increase the temperature of the coolant under certain circumstances. Internal combustion engines (including engine 14) operate more efficiently once the temperature of the engine is at or above a temperature threshold. When an internal combustion engine is operating at a temperature below the temperature threshold, internal engine friction losses (including friction losses that occur at the piston to cylinder ring interfaces, various bearings, and valve train components) may increase. This is a function of local engine oil and metal temperatures which are influenced by engine coolant temperature. Also, fuel tends to form a film on the internal surfaces of the air intake components of the engine, which disrupts the air/fuel control system resulting in increased emissions from of the engine. The electric heater 76 may be operated to increase the temperature of the coolant, which in turn will increase the temperature of the engine 14, when the engine 14 is operating below a temperature threshold. The temperature threshold of an engine for efficiency purposes may coincide with a minimum operating temperature of the coolant that ranges between 180° F. and 220° F. The temperature threshold of the engine for emission purposes may coincide with a minimum operating temperature of the coolant that ranges between 110° F. and 140° F.

The engine 14 may shut down under certain circumstances to save fuel and increase fuel efficiency. When the engine 14 is shut down, the HEV 10 may be powered via the M/G 18, which receives electrical power from the traction battery 20. When the M/G 18 is powering the HEV 10 alone, the HEV 10 is operating in what may be referred to as EV mode (i.e., electric vehicle mode). The period of time the HEV 10 may operate in EV mode is typically limited to the amount of charge in the traction battery 20. However, the period of time the HEV 10 may operate in EV mode may also be limited by the minimum operating temperature of the coolant, in order to ensure that the engine 14 is operating above the temperature threshold for emission purposes. The electric heater 76 may be operated to increase the temperature of the coolant, in order to maximize the period of time that the HEV 10 is operating in EV mode. The electric heater 76 may be operated in anticipation of an EV mode or during an EV mode. The minimum temperature of the engine coolant required to maximize the time period that the HEV 10 is an EV mode, may coincide with the minimum operating temperature of the coolant for emission purposes (ranging between 110° F.-140° F.), or it may coincide with the minimum operating temperature of the coolant for efficiency purposes (ranging between 180° F.-220° F.). Alternatively, the minimum temperature of the engine coolant required to maximize a period that the HEV 10 is an EV mode, may be a reserve temperature value that exceeds the minimum operating temperature of the coolant for emission purposes by 5° F.-40° F. or maybe a reserve temperature value that exceeds the minimum operating temperature of the coolant for efficiency purposes by 5° F.-40° F.

The electric heater 76 may also be operated to increase the temperature of the engine coolant during periods of time the second heat exchanger 70 and blower 72 are operating to heat air that is flowing into the cabin of the HEV 10. The minimum temperature of the engine coolant required when the second heat exchanger 70 and blower 72 are being used, may coincide with the minimum operating temperature of the coolant for efficiency purposes (ranging between 180° F.-220° F.), or may be a reserve temperature value that exceeds the minimum operating temperature of the coolant for efficiency purposes. For example, the minimum temperature of the engine coolant required when the second heat exchanger 70 and blower 72 are being used may exceed the minimum operating temperature of the coolant for efficiency purposes by 5° F.-40° F.

The electric heater 76 may also be operated to increase the temperature of the engine coolant in anticipation of using the second heat exchanger 70 and blower 72 to heat the air that is flowing into the cabin of the HEV 10. For example, if the ambient air temperature is below a threshold (ranging between 45° F.-65° F.) and the engine coolant is operating below a desired operating temperature (ranging between hundred 180° F.-220° F.) it may be advantageous to operate the electric heater 76 due to the likely use of the second heat exchanger 70 and blower 72 to heat the air flowing into the cabin of the HEV 10.

It may also be advantageous to operate the electric heater 76 in order to increase the temperature of the engine oil under certain circumstances. Internal combustion engines (including engine 14) operate more efficiently once the temperature of the engine oil is at or above an optimal temperature threshold. Engine oil is more viscous at lower temperatures, which increases the friction between moving parts of the engine, resulting in a loss in efficiency. The electric heater 76 may be operated to increase the temperature of the coolant, which in turn will increase the temperature of the engine oil, when the engine oil is operating below the optimal temperature threshold. In an alternative embodiment, the electric heater 76 may be configured to directly increase the temperature of the engine oil. The optimal temperature threshold of the engine oil may range between 180° F. and 250° F.

Figure 3:
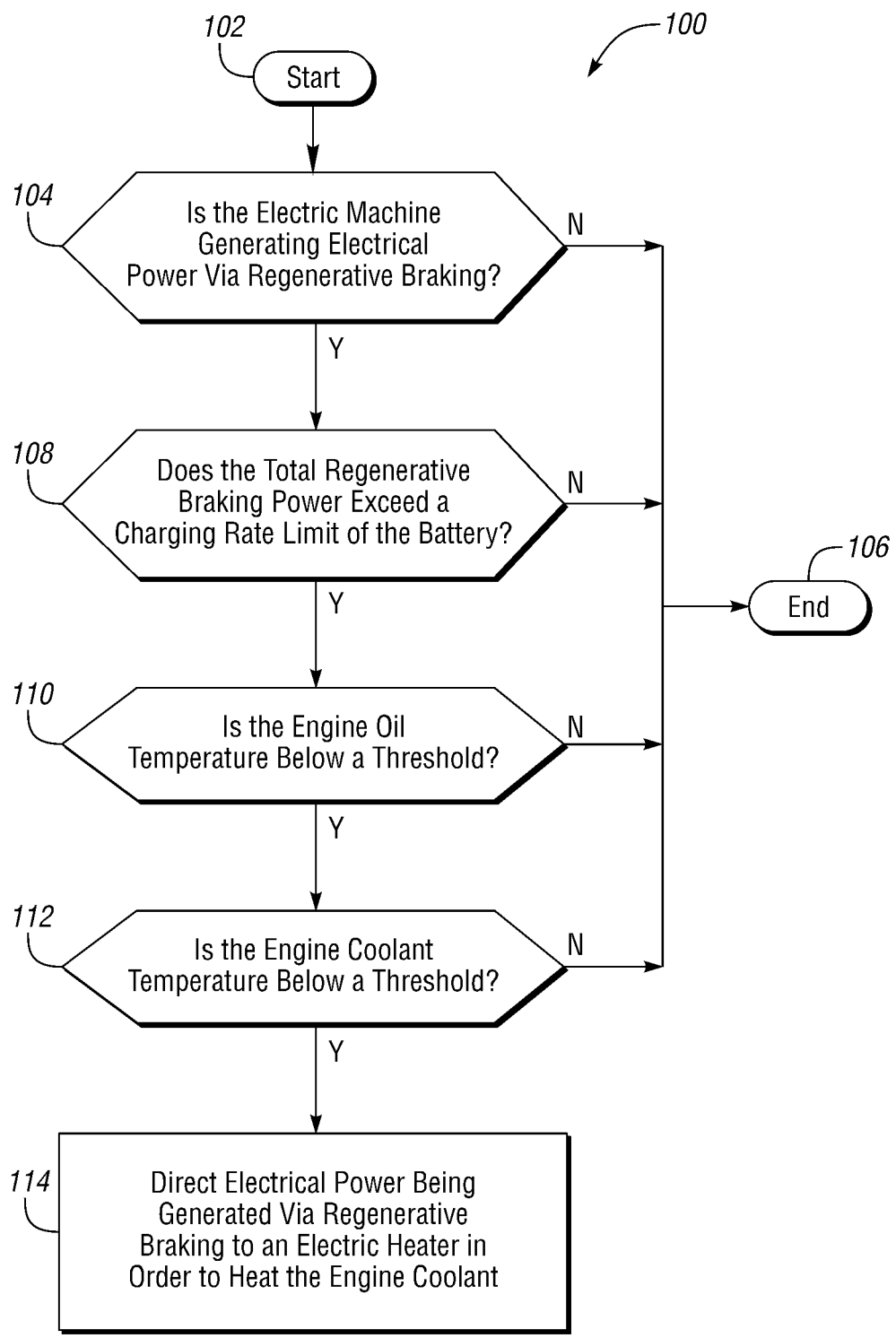
FIG. 3 is a method of utilizing regenerative braking power to operate an electric heater in order to heat the engine coolant of a hybrid electric vehicle.

Referring to FIG. 3, a method 100 of utilizing regenerative braking power to operate the electric heater 76 in order to heat the engine coolant is illustrated. The method 100 is initiated at the start block 102. The method 100 may be initiated by placing a vehicle ignition into an "on" position, pressing a "start/run" button, placing the transmission of the HEV 10 into a specific gear selection, or by any other appropriate condition where the HEV 10 may potentially be generating power via the M/G 18 through regenerative braking.

At step 104 it is determined if the M/G 18 (electric machine) is generating electrical power via regenerative braking. If the M/G 18 is not generating electrical power via regenerative braking, the method 100 ends at step 106. If the M/G 18 is generating electric power via regenerative braking, the method moves on to step 108.

At step 108 it is determined if the total regenerative braking power being generated exceeds a charging rate limit of the traction battery 20. The charging rate limit of the traction battery 20 may be dictated by several factors, including the capacity of the traction battery 20 to receive charge, the capacity of the power electronics 56 to transport electricity, the maximum power of the M/G 18, or the maximum torque of the M/G 18. If the total regenerative braking power does not exceed the charging rate limit of the traction battery 20, the method 100 ends at step 106. If the total regenerative braking power does exceed the charging rate limit of the traction battery 20, the method moves on to step 110.

At step 110 it is determined if the engine oil temperature is below a threshold. The threshold of the engine oil temperature may correspond to the optimal temperature threshold of the engine oil discussed above. If the engine oil temperature is not below a threshold, the method 100 ends at step 106. If the engine oil temperature is below a threshold, the method moves on to step 112.

At step 112 it is determined if the engine coolant temperature is below a threshold. The threshold of the engine coolant temperature may correspond to any of the coolant temperatures discussed above that relate to engine emissions, engine efficiency, maximizing the period of time the HEV 10 is operating in EV mode, heating air flowing into the cabin of the HEV 10, or the anticipation of heating air flowing into the cabin of the HEV 10. If the engine coolant temperature is not below a threshold, the method 100 ends at step 106. If the engine coolant temperature is below a threshold, the method moves on to step 114.

At step 114, electrical power being generated by the M/G 18 through regenerative braking is directed to power the electric heater 76 in order to heat the engine coolant. The amount of regenerative braking power directed to power the electric heater 76 may correspond to a portion of the total regenerative braking power that exceeds the charging rate limit of the traction battery 20.

The method 100 should not be construed as limited to the depiction in FIG. 3, but should be construed to include variations where one or more of the steps may be reorganized chronologically or omitted.

It should be understood that the hybrid vehicle configuration in FIG. 1 is merely exemplary and is not intended to be limited. The schematic of FIG. 2 and the method of FIG. 3 may be applicable to other hybrid vehicle configurations, which should be construed as disclosed herein. Other hybrid vehicle configurations that should be construed as disclosed herein include series hybrid vehicles, parallel hybrid vehicles, series-parallel hybrid vehicles, power-split hybrid vehicles, plug-in hybrid electric vehicles (PHEVs), fuel cell hybrid vehicles, or any other hybrid vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    an engine;
    an electric machine configured to recharge a battery through regenerative braking and power the vehicle during an electric vehicle mode where the engine is shutdown;
    an electric heater configured to heat an engine coolant; and
    a controller programmed to, in response to the engine only or a combination of the engine and the electric machine powering the vehicle prior to a temperature of the engine coolant increasing to a minimum temperature that coincides with a transition of the vehicle to the electric vehicle mode, direct regenerative braking power to the electric heater.

2. The vehicle of claim 1, wherein the regenerative braking power redirected to the electric heater is a portion of the total regenerative braking power that exceeds a charging rate limit of the battery.

3. The vehicle of claim 1, wherein the minimum temperature is a temperature of the engine coolant required to maximize efficiency of the engine.

4. A method of heating engine coolant in a hybrid vehicle comprising:
    generating power with an electric machine via regenerative braking; and
    directing the power from the electric machine to an electric heater in order to heat the engine coolant in response to an engine only or a combination of the engine and the electric machine powering the vehicle prior to a temperature of the engine coolant increasing to a minimum temperature that coincides with a transition of the vehicle to a mode where the electric machine powers the vehicle alone.

5. The method of claim 4, wherein the power directed to the electric heater is a portion of total regenerative braking power that exceeds a charging rate limit of a battery.

6. The method of claim 4, wherein the minimum temperature is a temperature of the coolant required to maximize engine efficiency.

7. A vehicle comprising:
an engine;
an electric machine configured to recharge a battery through regenerative braking;
an electric heater configured to heat an engine coolant;
a controller programmed to, in response to the engine powering the vehicle prior to the engine coolant increasing to a threshold temperature that coincides with a transition of the vehicle to a mode where the electric machine alone powers the vehicle, direct regenerative braking power to the electric heater.

8. The vehicle of claim 7, wherein the regenerative braking power directed to the electric heater is a portion of the total regenerative braking power that exceeds a charging rate limit of the battery.

9. The vehicle of claim 7, wherein the threshold temperature is a temperature of the engine coolant required to maximize efficiency of the engine.

\* \* \* \* \*

UNITED STATES PATENT AND TRADEMARK OFFICE
CERTIFICATE OF CORRECTION

PATENT NO. : 9,789,765 B2  
APPLICATION NO. : 14/713586  
DATED : October 17, 2017  
INVENTOR(S) : Kenneth James Miller et al.

Page 1 of 1

It is certified that error appears in the above-identified patent and that said Letters Patent is hereby corrected as shown below:

Column 11, Line 15, Claim 7:
After "heat an engine coolant;"
Insert --and--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*